United States Patent [19]

Nakao

[11] Patent Number: 5,274,780
[45] Date of Patent: Dec. 28, 1993

[54] BUS CONTROLLER FOR ADJUSTING A BUS MASTER TO A BUS SLAVE

[75] Inventor: Yuichi Nakao, Itami, Japan

[73] Assignee: Mitsubishi Denki Kabushiki Kaisha, Tokyo, Japan

[21] Appl. No.: 475,567

[22] Filed: Feb. 6, 1990

[30] Foreign Application Priority Data

Jul. 27, 1989 [JP] Japan .................. 1-196161

[51] Int. Cl.$^5$ .................. G06F 13/38; G06F 13/00
[52] U.S. Cl. .................. 395/325; 395/500; 364/DIG. 2; 364/926.9; 364/926.91; 364/935.4; 364/942.4; 364/240.3
[58] Field of Search .................. 395/275, 325, 500

[56] References Cited

U.S. PATENT DOCUMENTS

| | | | |
|---|---|---|---|
| 4,271,466 | 6/1981 | Yamamoto et al. | 395/425 |
| 4,340,932 | 7/1982 | Bakula et al. | 395/425 |
| 4,449,181 | 5/1984 | Young et al. | 395/425 |
| 4,456,957 | 6/1984 | Schieltz | 395/200 |
| 4,633,437 | 12/1986 | Mothersole et al. | 395/250 |
| 4,649,477 | 3/1987 | MacGregor et al. | 395/775 |
| 4,667,305 | 5/1987 | Dill et al. | 395/325 |
| 4,695,948 | 9/1987 | Blevins et al. | 395/325 |
| 4,727,475 | 2/1988 | Kiremidjian | 395/325 |
| 4,751,632 | 6/1988 | Mothersole et al. | 395/325 |
| 4,766,538 | 8/1988 | Miyoshi | 395/325 |
| 4,831,514 | 5/1989 | Turlakov et al. | 395/500 |
| 4,914,573 | 4/1990 | Scales, III et al. | 395/425 |
| 5,027,475 | 12/1991 | Theus et al. | 395/425 |
| 5,054,024 | 10/1991 | Whetsel | 371/22.3 |
| 5,073,969 | 12/1991 | Shoemaker | 395/725 |
| 5,088,028 | 2/1992 | Theus et al. | 395/325 |
| 5,109,332 | 4/1992 | Culley | 395/325 |
| 5,109,490 | 4/1992 | Arimilli et al. | 395/325 |
| 5,113,369 | 5/1992 | Kinoshita | 395/325 |

*Primary Examiner*—Parshotam S. Lall
*Assistant Examiner*—Krisna Lim
*Attorney, Agent, or Firm*—Townsend and Townsend Khourie and Crew

[57] ABSTRACT

A bus controller (20) for a data processing system, in which data is transferred between a bus master (10) and a bus slave (30) of a plurality of different data port sizes, is able to obtain port size information from an address signal using an incorporated address area/port size correspondence table (211), whereby a port size signal as a response signal from the bus slave is made unnecessary, thus simplifying the data processing system.

4 Claims, 9 Drawing Sheets

| INPUT | | | | | OUTPUT | | |
|---|---|---|---|---|---|---|---|
| SLAVE BUS SECOND CYCLE SIGNAL | MBC 0 | MBC 1 | MBC 2 | MBC 3 | SA 30 | SBC 20 | SBC 21 |
| 0 | 0 | 0 | 0 | 0 | 1 | 0 | 0 |
| 0 | 0 | 0 | 0 | 1 | 1 | 0 | 1 |
| 0 | 0 | 0 | 1 | 0 | 1 | 1 | 0 |
| 0 | 0 | 0 | 1 | 1 | 1 | 1 | 1 |
| 0 | 0 | 1 | X | X | 0 | 0 | 1 |
| 0 | 1 | 0 | X | 0 | 0 | 1 | 0 |
| 0 | 1 | X | X | 1 | 0 | 1 | 1 |
| 0 | 1 | 1 | X | X | 0 | 1 | 1 |
| 1 | X | X | X | 0 | 1 | 1 | 0 |
| 1 | X | X | X | 1 | 1 | 0 | 1 |

| INPUT | | | | OUTPUT | | |
|---|---|---|---|---|---|---|
| BUS SIZE 2-BYTE/ 4-BYTE | SLAVE BUS SECOND CYCLE | MBC0 | MBC1 | DATA BUS CONNECT HH | DATA BUS CONNECT LL | DATA BUS CONNECT LH |
| 0 | X | X | X | 1 | 1 | 0 |
| 1 | 0 | 0 | 0 | 0 | 0 | 1 |
| 1 | 0 | X | 1 | 1 | 0 | 0 |
| 1 | 0 | 1 | X | 1 | 0 | 0 |
| 1 | 1 | X | X | 0 | 0 | 1 |

FIG. 10 PRIOR ART

BUS CONTROLLER FOR ADJUSTING A BUS MASTER TO A BUS SLAVE

BACKGROUND OF THE INVENTION

The present invention relates to data processing systems and, more particularly, to a bus controller for a data processing system in which data is transferred between a bus master and a bus slave of a plurality of different data port widths via a bus.

Figure 10:
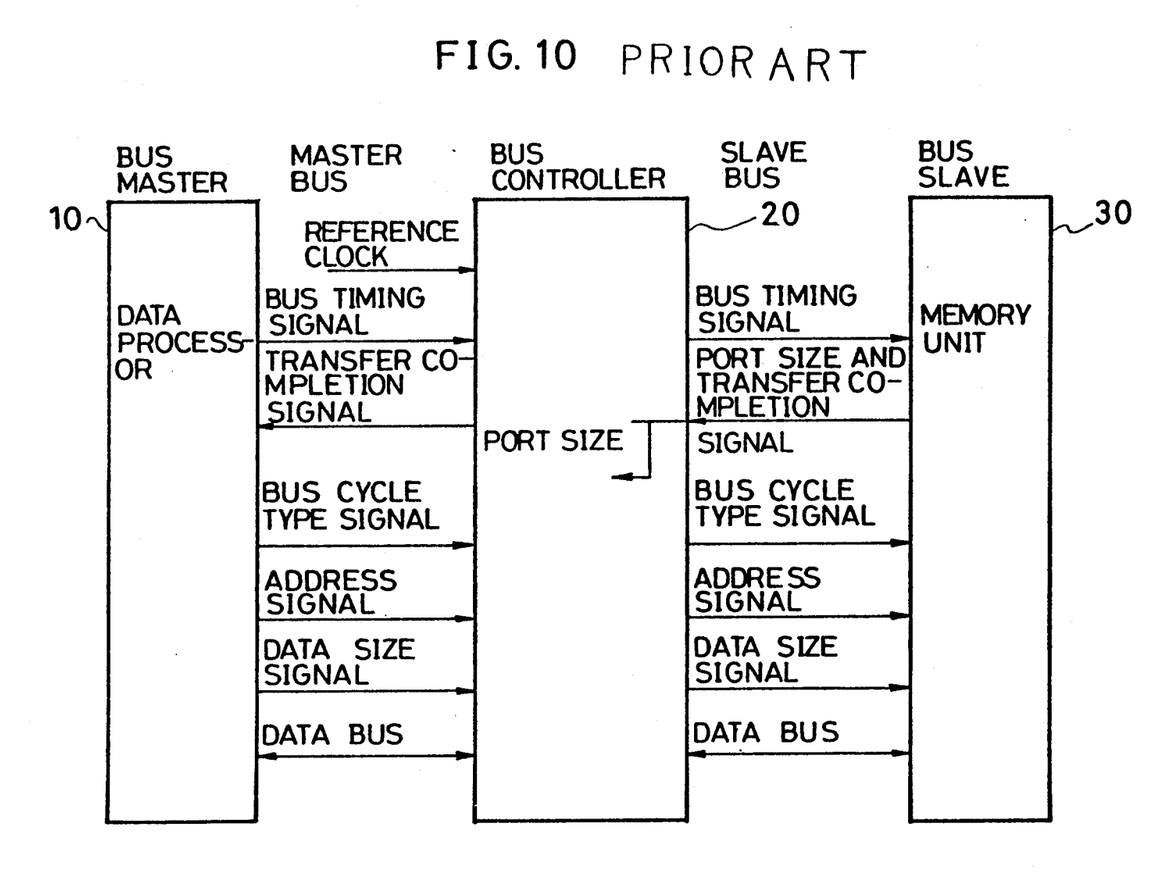
FIG. 10 is a block diagram of a data processing system with a conventional bus controller.

Japanese Patent Application Kokai No. 61-502565 discloses a data processor having a dynamic bus sizing capability. A conventional bus controller having a bus sizing function such as shown in the above Japanese patent is shown in FIG. 10. A bus controller 20 is connected between a data processor 10 as a bus master and a memory unit 30 as a bus slave. The data processor 10 has a 32-bit data port.

The data processor 10 executes instructions specified by the user. Each instruction is read from the memory unit 30 in a predetermined order. In execution of each instruction, the data processor 10 can perform specified operations on data of an 8-bit (byte), 16-bit (half word), or 32-bit (word) size. Most of these data operands are read from or written into the memory unit 30 via a bus.

The memory unit or bus slave 30 can have a data port smaller than that of the data processor 10. For example, peripheral equipment of 8 or 16 bits can be connected to the bus, or part of the memory unit can be connected to a remote data processor 10 via a data bus of a smaller size. Even in the same port size, the operand requested by the data processor 10 can be at an address which is not aligned to the data port of a bus slave. Where operands are not aligned, or the port size is different between a data processor and a memory unit, the bus controller 20 must adjust the position of data on the bus for correctly transferring the requested data or instruction operand.

In operation, the data processor 10 requests operand transfer by asserting the bus cycle start signal of a bus timing signal for the bus controller 20, and indicates the direction of operand transfer with the read cycle/write cycle signal (R/$\overline{\text{W}}$) of a bus cycle type signal and the size of a transfer operand with a data size signal. Also, it provides a 32-bit master address signal MA (0:31), into or from which the operand is transferred.

The data processor 10 requests an operand write operation as follows. Upon reception of a bus cycle start signal, the bus controller 20 outputs master address information at the address signal line of a slave for transfer to the memory unit 30. The same applies for bus cycle type and data size signals. After a predetermined period of time, the bus controller 20 asserts the address strobe signal (AS) of a slave bus timing signal to indicate that a valid operand address is on the slave address signal line.

The bus controller 20 also determines a connection condition between the master and slave data buses based on information about two insignificant bits of a master address signal and a data size signal and provides output data to an appropriate byte on the slave data bus. Furthermore, it asserts the data strobe signal (DS) of a bus timing signal, informing the memory unit 30 that the operand on the data bus is valid.

Upon reception of the AS, the memory unit 30 decodes the address signal. If it finds itself selected, it prepares to latch the operand. In order to make correct transfer, the memory unit 30 positions the significant byte of a data port on the significant byte of a data bus. Consequently, upon reception of the DS, it is able to latch at least the significant byte of an operand during the first bus cycle of an operand cycle.

Then, the memory unit 30 outputs a port size and transfer completion signal to inform the data processor 10 of the transfer completion. The port size and transfer completion signal also indicates the data port size of the memory unit 30 to which the transfer is made.

Based on the information about the data size signal, two insignificant bits of the address signal, and the port size from the memory unit 30, the bus controller 20 is able to recognize which part of the operand has been transferred and which part remains untransferred. If there is the remaining part of unreceived operand, the size is determined. If an additional bus cycle is necessary for completing the operand cycle, the bus controller 20 recalculates the address signal of two insignificant bits for the remaining part of the operand.

In this way, the bus controller 20 operates until all the requested operands are latched in the memory unit 30. When all the operands are transferred, the bus controller outputs a master transfer completion signal to the data processor 10.

The write operand cycle is summarized as follows.
Bus Master and Bus Controller
1) Set the read cycle/write cycle (R/$\overline{\text{W}}$) write cycle.
2) Output an address signal.
3) Output a data size signal.
4) Assert an address strobe (AS).
5) Determine the position of a data output based on information about two insignificant bits of an address and a data size and output operand data.
6) Assert a data strobe (DS).
Bus Slave
1) Decode an address signal.
2) Latch an operand byte on the data bus.
3) Assert a port size and transfer a completion signal.
Bus Master and Bus Controller
7) Negate the DS.
8) Negate the AS.
9) Stop outputting an operand on the data bus.
Bus Slave
4) Negate the port size and transfer completion signal.
Bus Master and Bus Controller
10) If not all of the operands are transferred because of the port size, recalculate the address and size and return to the step 1)
11) Otherwise, complete the operand cycle.

The read cycle, on the other hand, is summarized as follows.
Bus Master and Bus Controller
1) Set the R/$\overline{\text{W}}$ signal to the read cycle.
2) Output an address signal.
3) Output a data size signal.
4) Assert an AS.
5) Assert a DS.
Bus Slave
1) Decode the address signal.
2) Output data at the data bus position corresponding to the address signal and data size signal.
3) Assert a port size and transfer complete signal.
Bus Master and Bus Controller
6) Latch the transferred data at the byte position determined by the address signal, port size, and data size.

7) Negate the DS.
8) Negate the AS.
Bus Slave
4) Stop outputting data to the data bus.
5) Negate the port size and transfer completion signal.
Bus Master and Bus Controller
9) If not all of the operands are transferred, recalculate the address and data size and return to the step 1).
10) Otherwise, complete the operand cycle.

In this way, the bus controller 20 performs dynamic sizing of a communications bus for each cycle based on the port size information from the bus slave.

However, it is necessary to output both the data transfer completion signal and the port size response on the same signal line depending on the bus slave, bringing about the following problems.

In order to increase the bus transfer speed, the data transfer completion signal should be sampled toward the end of a bus cycle, but it should be sampled earlier because it is necessary to determined the byte position at which data is written in the register based on the port size and then recalculate the address before start of the next bus cycle. Consequently, a high-speed circuit has been demanded to sample both the data transfer completion signal and the port size response signal with the same timing for bus cycling.

Also, it has been difficult to make a wait controller which operates independently of the bus slave and asserts the data transfer completion signal with predetermined timing corresponding to the address area.

SUMMARY OF THE INVENTION

Accordingly, it is an object of the invention to provide a bus controller which is able to provide port size information independently of a response from the bus slave.

According to the invention there is provided a bus controller which includes a address areas/port size correspondence table and a determination unit responsive to master address information to provide port size information by using the correspondence table in a bus cycle, thus producing the port size information independently of a data transfer completion signal from the bus slave. Hence, it is possible to adjust the maximum width of bus slave data to be transferred at once and the bit positions for inputting and outputting data for performing data transfer with the data width aligned to the port size of the bus slave to which data is transferred.

The above and other objects, features, and advantages of the invention will become more apparent from the following description when taken in conjunction with the accompanying drawings.

DESCRIPTION OF THE PREFERRED EMBODIMENT

Figure 1:
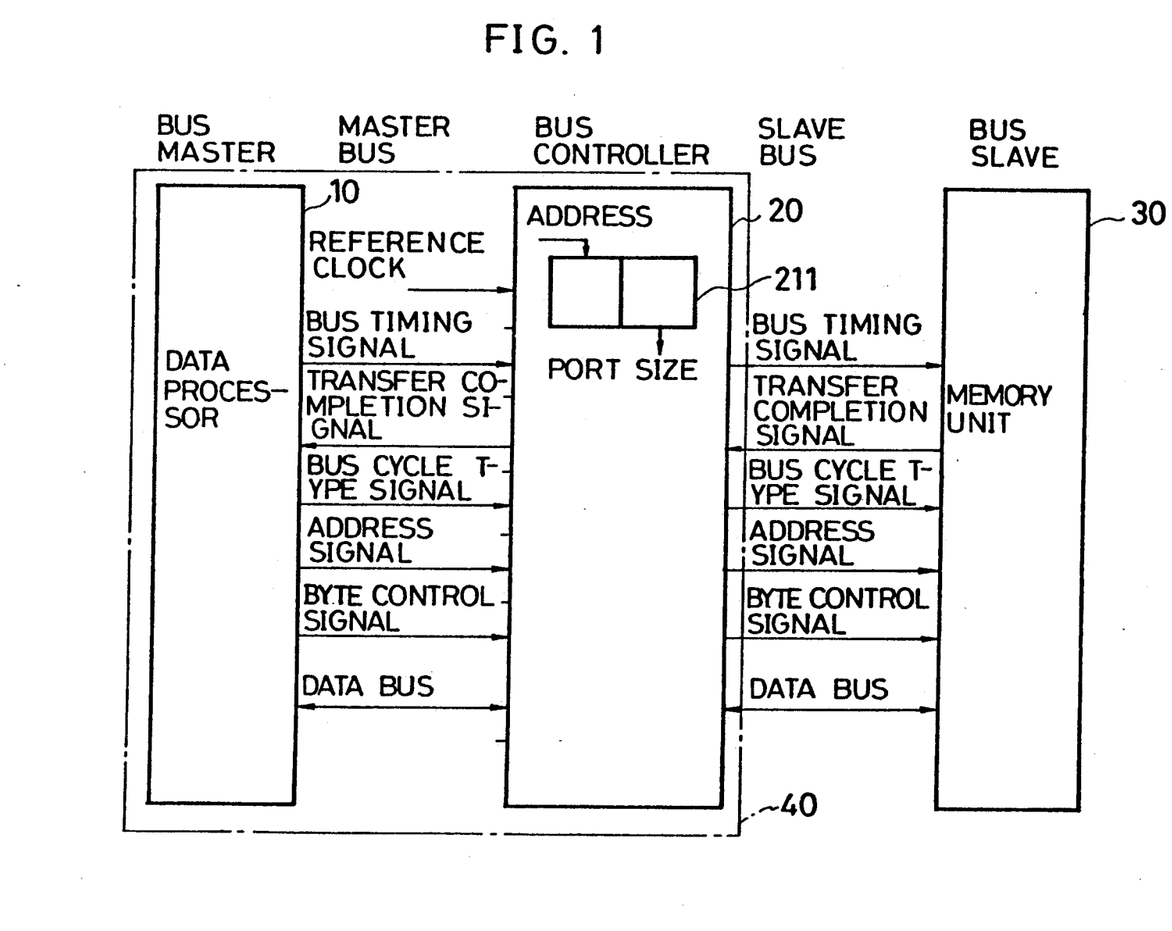
FIG. 1 is a block diagram of a data processing system with a bus controller according to an embodiment of the invention.

In FIG. 1, the data processing system includes a data processor or bus master 10 with a 32-bit address bus and a 32-bit data bus, a bus controller 20, and a memory unit or bus slave 30.

Figure 2:
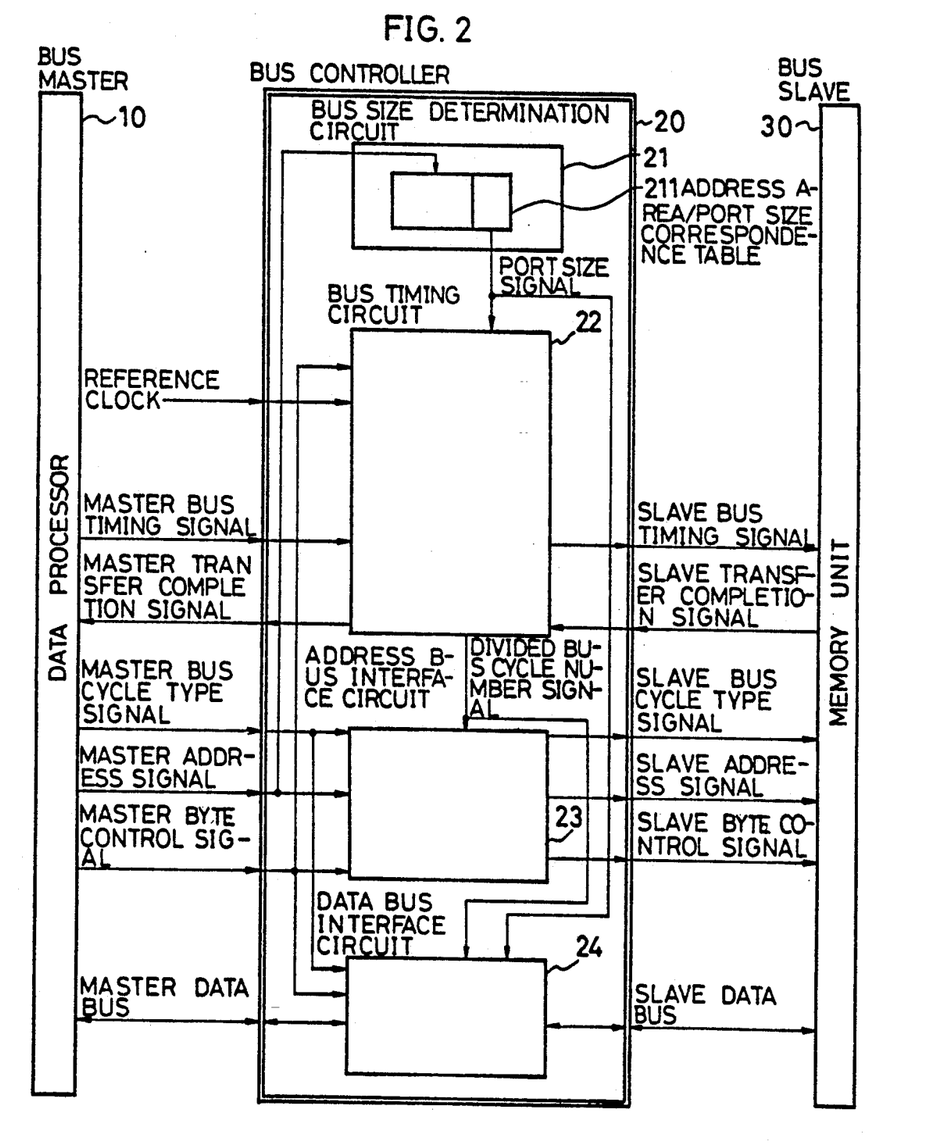
FIG. 2 is a block diagram of the bus controller of FIG. 1.

As best shown in FIG. 2, the bus controller 20 includes a bus size determination circuit 21 which has an address area/port size correspondence table 211 and is responsive to address information from the data processor 10 to obtain a port size information from the correspondence table 211 and output a port size signal; a bus timing circuit 22 which receives a reference clock, a master bus timing signal, a master bus control signal, a slave transfer completion signal, and the port size signal and outputs a slave timing signal, a master transfer completion signal, and a divided bus cycle number signal; an address bus interface circuit 23 which receives a master bus cycle type signal, a master address signal, a master bus control signal, and the divided bus cycle number signal and outputs a slave bus cycle type signal, a slave address signal, and a slave bus control signal; and a data bus interface circuit 24 which receives a master bus cycle type signal, a master bus control signal, and the port size signal and divided bus cycle number signal and determines a connection condition between the master data bus and the slave data bus for connection. The bus controller in this embodiment is designed for use in 16 and 32 bit port sizes.

Figure 3:
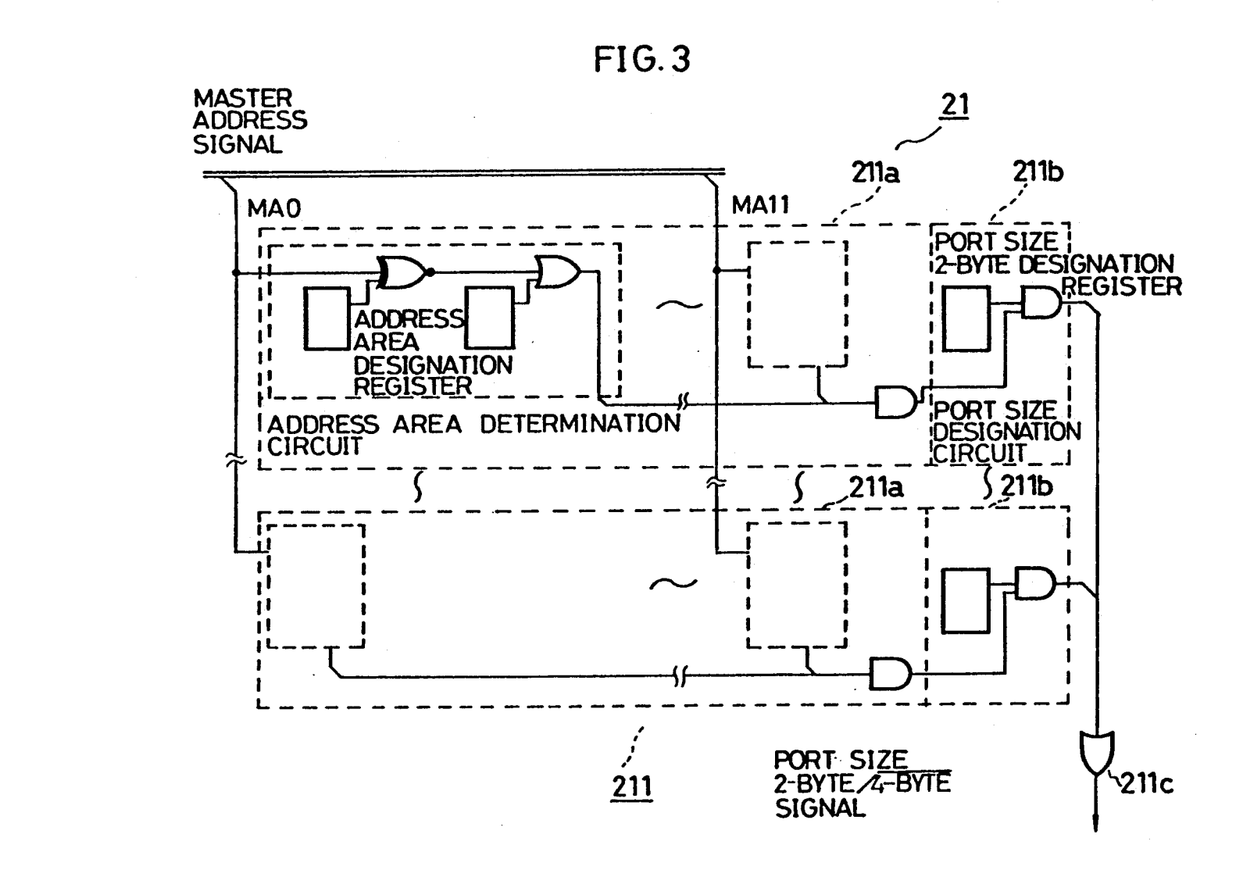
FIG. 3 is a schematic diagram of a bus size determination circuit useful for the bus controller of FIG. 2.

In FIG. 3, the bus size determination circuit 21 includes a plurality of address area determination circuits 211a which receive predetermined most significant bits of a master address signal and determine if each bit agrees with the value set in an address area designation register, making the output significant when all the bits agree with the values; a plurality of port size designation circuits 211b which each are coupled to the address area determination circuits 211a for each address area and are responsive to the significant output to output the value set in a port size 2-byte designation register; and an OR gate 211c which receives respective outputs from the port size designation circuits 211b and outputs a port size 2-byte or $\overline{\text{4-byte}}$ signal. In this way, the address area/port size correspondence table is materialized.

Figure 4:
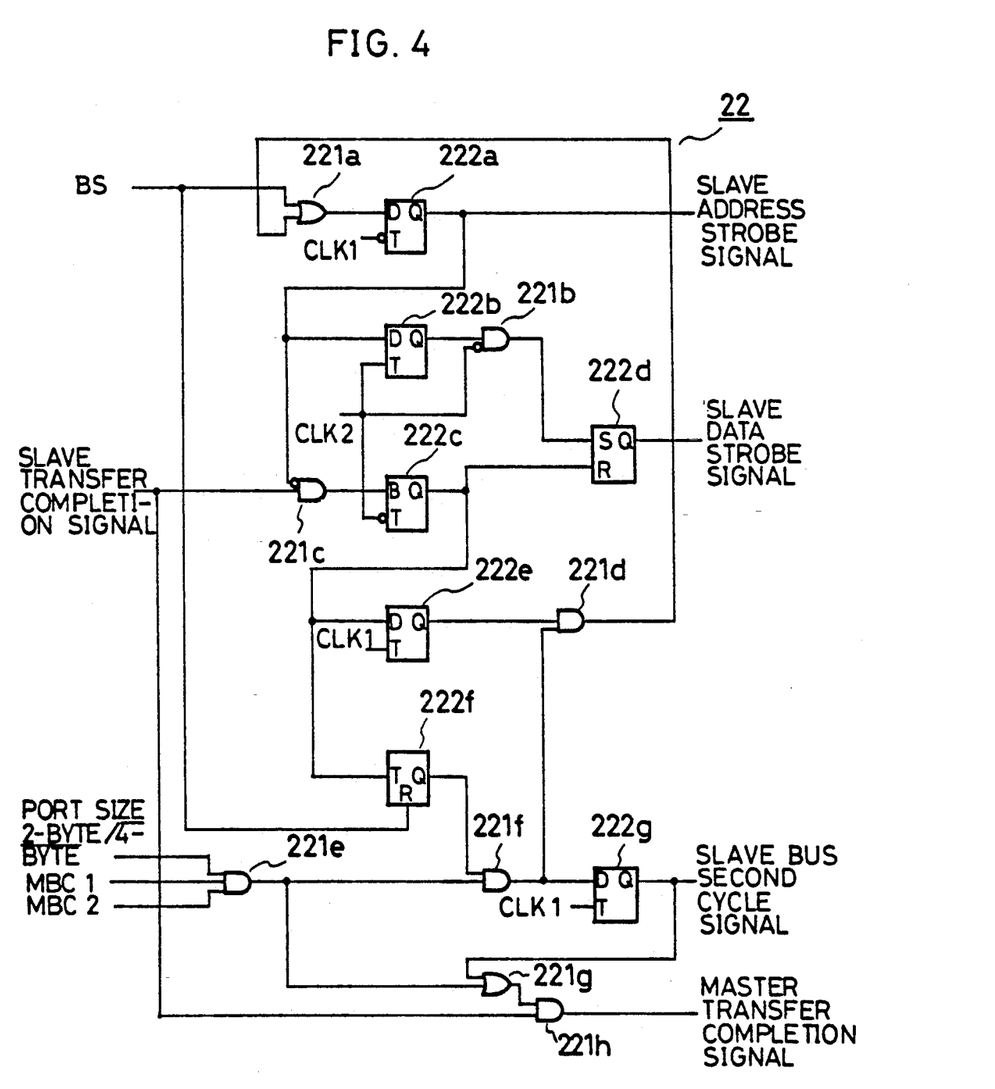
FIG. 4 is a schematic diagram of a bus timing circuit useful for the bus controller of FIG. 2.
Figure 5:
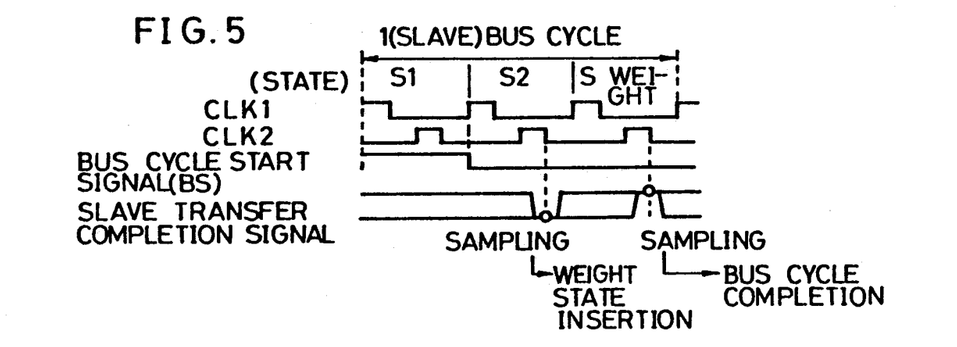
FIG. 5 is a timing chart for the bus timing circuit of FIG. 4.

In FIG. 4, the bus timing circuit 22 includes eight logic circuits 221a-221h and seven flip-flops 222a-222g. The input timing of respective signals is shown in FIG. 5.

Figure 6:
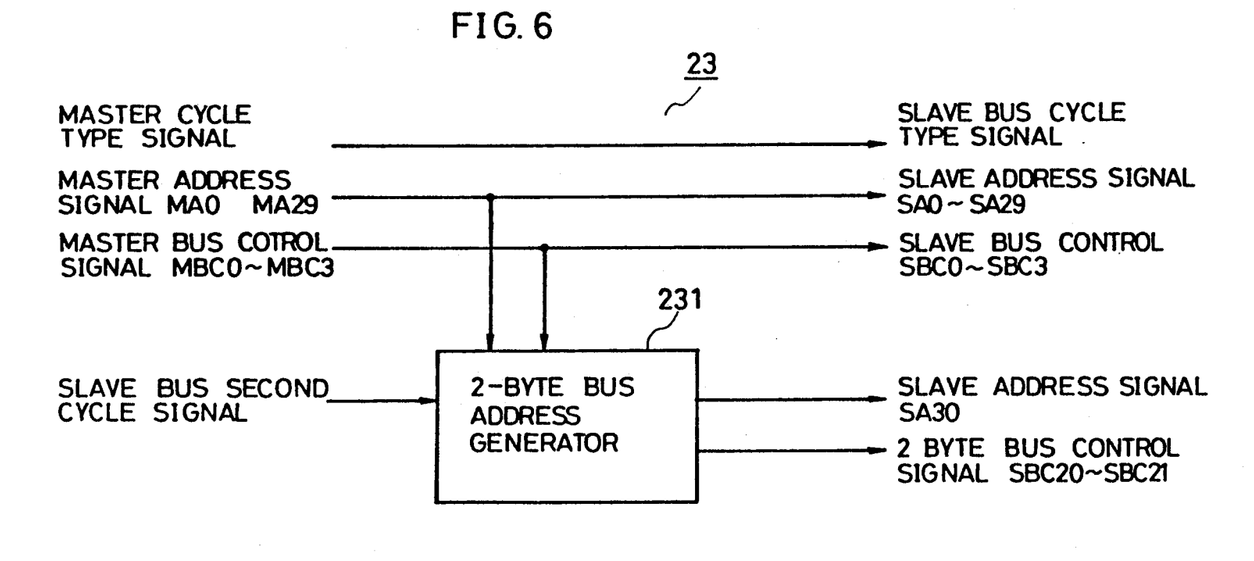
FIG. 6 is a block diagram of an address bus interface circuit useful in the bus controller of FIG. 2.
Figure 7:
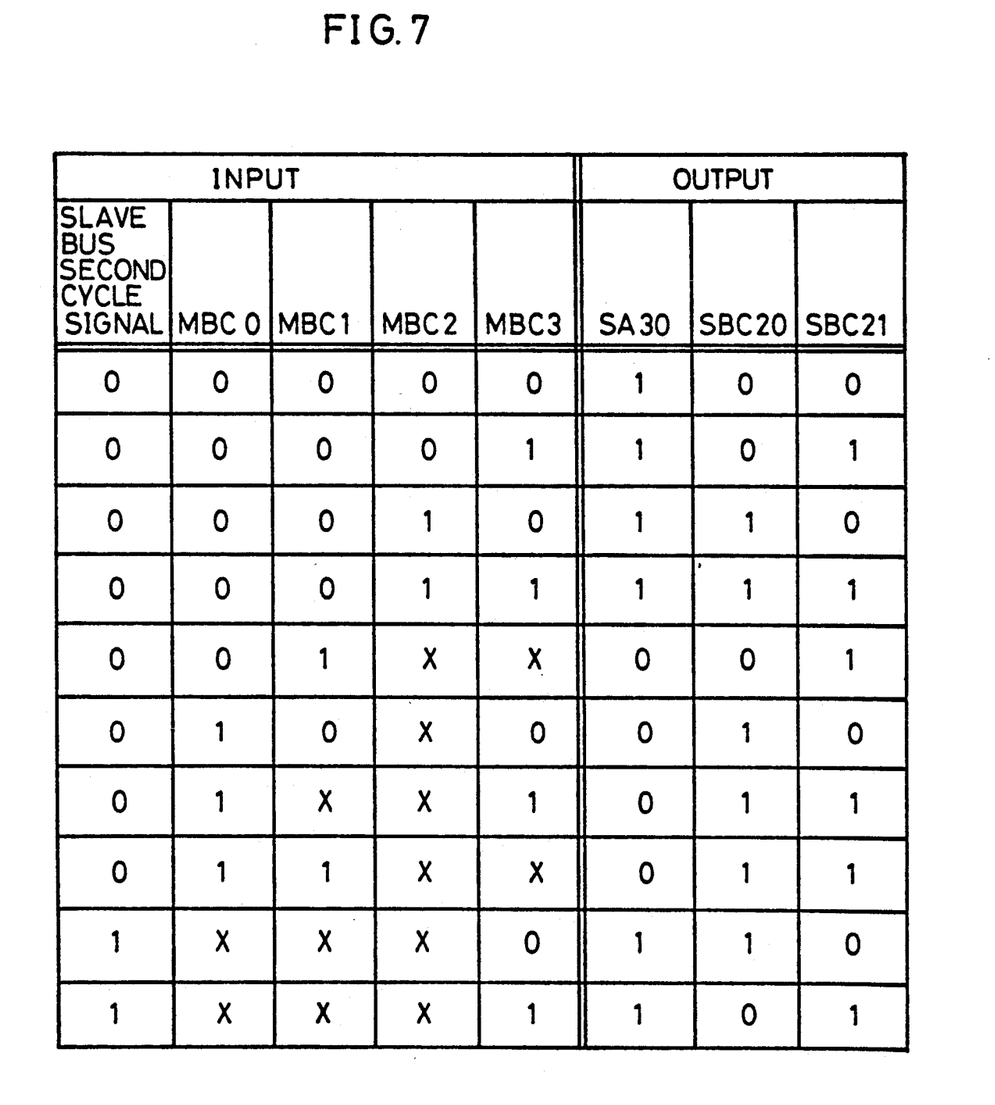
FIG. 7 is a table useful for the address bus interface circuit of FIG. 6.

In FIG. 6, the address bus interface circuit 23 includes a 2-byte bus address generation circuit 231 which is composed of various logic circuits so as to meet the truth table of FIG. 7.

Figure 8:
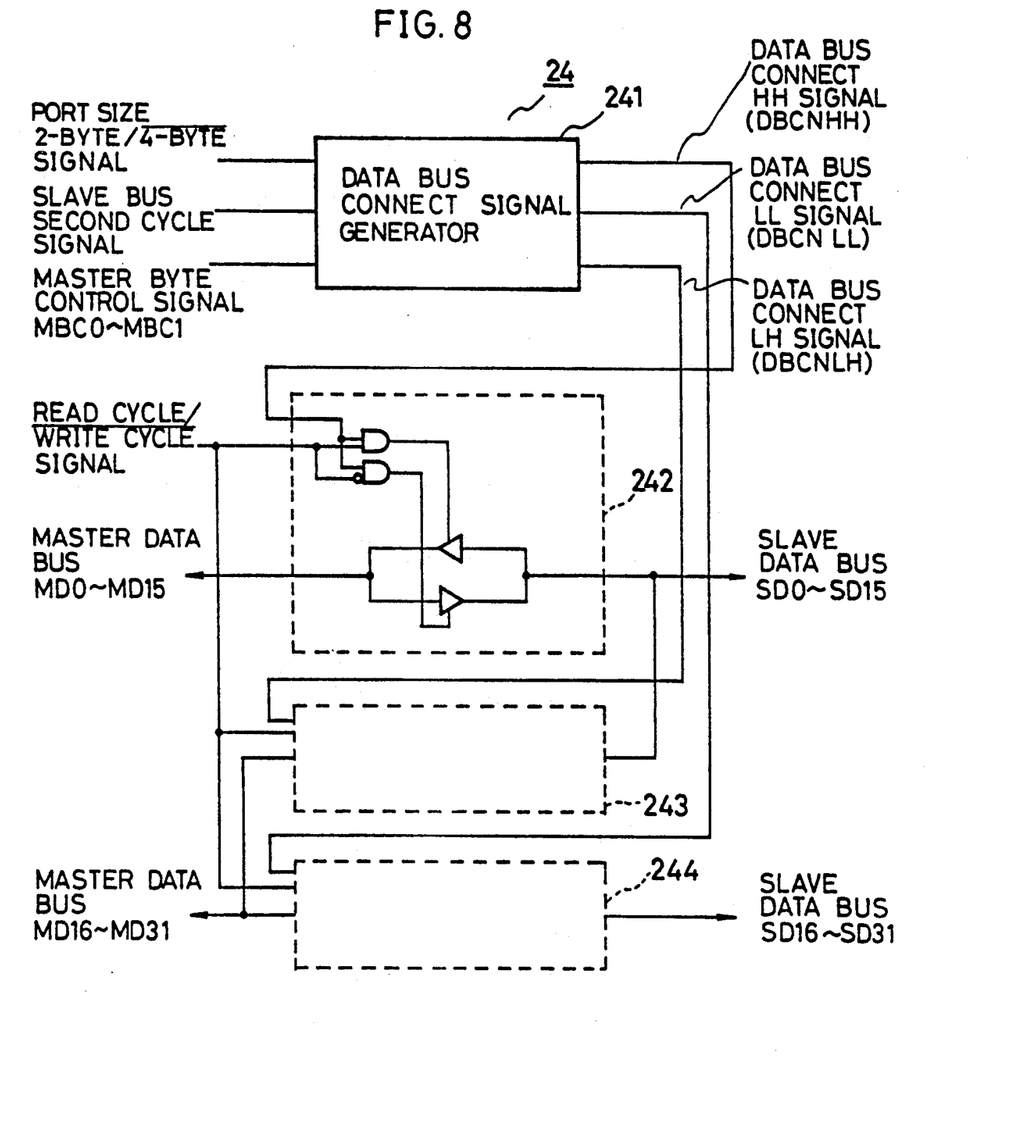
FIG. 8 is a schematic diagram of a data bus interface circuit useful for the bus controller of FIG. 2.
Figure 9:
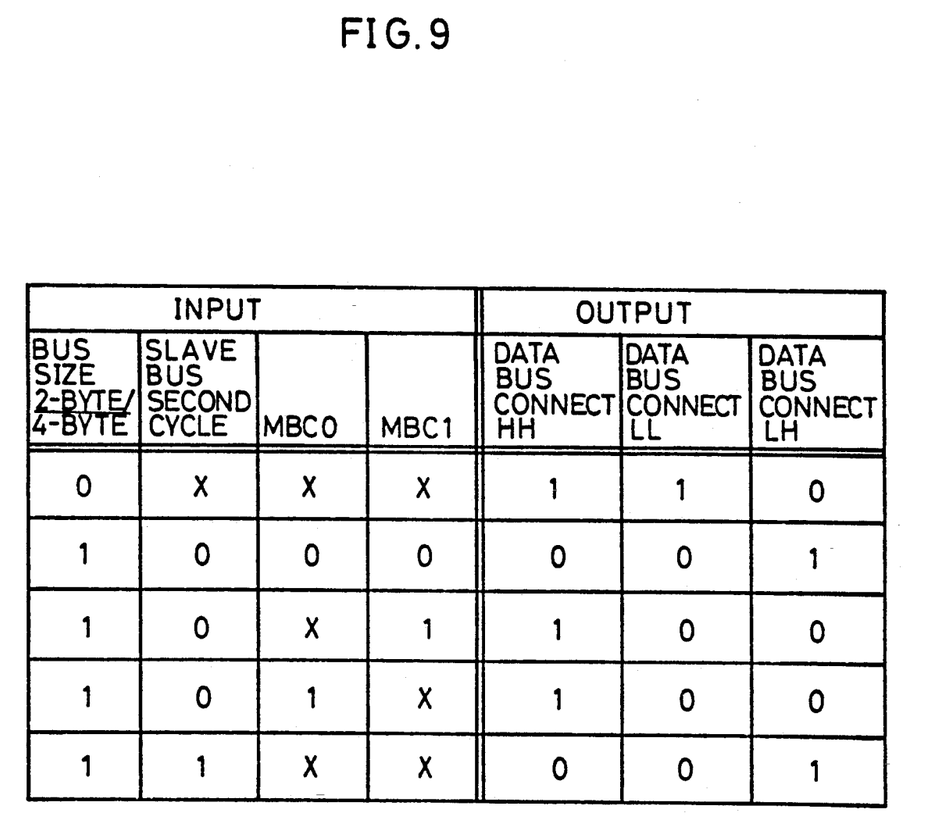
FIG. 9 is a table useful for the data bus interface circuit of FIG. 8.

In FIG. 8, the data bus interface circuit 24 includes a data bus connect signal generation circuit 241; a data bus buffer 242 which is responsive to a data bus connect signal and a read cycle/write cycle signal to connect master data bus MD0-MD15 to slave data bus SD0-SD15; a data bus buffer for connecting master data bus MD16–MD31 to slave data bus SD0–SD15; and a bus buffer 244 for connecting master data bus MD16–MD–31 to slave data bus SD16–SD31. The data bus connect signal generation circuit 241 is composed of various logic circuits such that its inputs and outputs meet the truth table of FIG. 9.

In operation, the data processor 10 performs operations determined for 32-bit, 16-bit, and 8-bit data operands. It requests a bus cycle by asserting the bus cycle start signal (BS) of a master bus timing signal for the bus controller 20 and outputs the read cycle/write cycle signal (R/W) of a master bus cycle type signal to indicate the direction of transfer. Also, it outputs a master address signal MA (0:29) and a master byte control signal MBC (0:3) in order to indicate a transfer start address and the byte position of transfer data. MA0 is the most significant bit (MSB), and the two least significant bits of an address are decoded in MBC (0:3). The signals MBC0, MBC1, MBC2, and MBC3 indicate bytes to be transferred to addresses (00), (01), (10), and (11), respectively.

The bus controller 20 detects which address area with a defined port size is aimed at by the started address cycle by using all or part of MA (0:29) and the address area/port size correspondence table 211 in the bus size determination circuit 21. If the bus cycle is aimed at an address area of a 16-bit port size, the bus controller asserts a port size 2-byte/4-byte signal and informs the respective circuits of the bus controller 20.

If the port size and the data to be transferred are 16 and 32 bits, respectively, and the second cycle is necessary, the bus timing circuit 22 determines the necessary cycle number based on the port size 2-byte/4-byte signal, master byte control signal (MBC 1, 2), and slave transfer completion signal and counts the slave transfer completion signal to generate a slave second cycle signal. Also, it generates a slave bus timing signal based on the master bus timing signal.

Based on information about the slave bus second cycle signal, port size 2-byte/4-byte signal, and master byte control signal (MBC 0, 1), the data bus interface circuit 24 determines the connection between the master data bus (MDB) and the slave data bus (SDB) for execution in the port size of the area at which the requested bus cycle is aimed and connects the data bus with a data bus connect signal DBCN (HH, LL, LH). The signals DBCNHH, DBCNLL, and DBCNLH indicate connections between MDB (0:15) and SDB (0:15), MDB (16:31) and SDB (16:31), and MDB (16:31) and SDB (0:15), respectively.

The bus controller 20 outputs to the memory unit 30 an R/W signal for indicating the direction of transfer, an address strobe signal (AS) for indicating the timing at which a valid address signal is outputted on the slave address bus, a data strobe signal (DS) indicating the timing at which a data signal valid in writing is outputted on the slave data bus.

The least significant bit SA 30 of an address necessary for 16-bit port size areas is generated by the address bus interface circuit 23 of the bus controller 20 based on the signal MBC (0:3).

One bus cycle is completed when the slave transfer completion signal is asserted for the bus controller 20 or a predetermined period of time measured in the bus controller 20 passes. However, if only part of the requested operands has been transferred because of the small port size, the bus controller restarts the bus cycle. The least significant bit SA 30 of an address in the restarted bus cycle is recalculated and outputted by the bus controller 20.

The write operand cycle is summarized as follows.
1) Indicate a write operation with an R/W signal.
2) Determine the port size with the address area/port size correspondence table.
3) Make transfer with the byte position on the data bus which matches the port size.
4) If not all of the operands are received, recalculate the address and size and return to the step 3).
5) Otherwise, complete the operand cycle.

The read cycle, on the other hand, is summarized as follows.
1) Indicate a read operation with an R/W signal.
2) Determine the port size with the address area/port size correspondence table.
3) Make transfer with the byte position on the data bus which matches the port size.
4) If not all of the operands are received, recalculate the address and size and return to the step 3).
5) Otherwise, complete the operand cycle.

In this way, the bus controller 20 performs sizing of a communications bus for each address area.

The contents of the address area/port size correspondence table may be changed by using the registers of FIG. 3 and software. Also, it is possible that the port size after resetting is set initially depending on the level of a specified signal line at resetting. Further, it is possible to incorporate the bus controller in the data processor or bus master. As shown by a broken line in FIG. 1, the bus controller is made on the semiconductor integrated circuit 40 along with the bus master 10 to simplify the structure of a data processing system.

If the data processor has a wait controller corresponding to the address area, it is possible to eliminate part of the bus controller circuit by providing a port size designation field in the address area/wait value correspondence table. The bus controller adapted to 16 and 32 bit port sizes has been described in the above embodiment, but a similar bus controller may be made for another port size combination. The data processor and the memory unit have been described as a bus master and a bus slave, but a direct memory access (DMA) controller and an input/output unit may be used as a master bus and a slave bus, respectively.

As has been described above, according to the invention, the port size information is obtained from the address area/port size correspondence table provided in the bus controller so that the port size signal is unnecessary as a response signal from the bus slave, thus simplifying the construction of a data processing system.

I claim:

1. A bus controller used for a data processing system having a data processor as a bus master, the bus controller connected between the bus master and a bus slave via a bus to transfer data between the bus master and the bus slave with a plurality of different data port widths, wherein the improvement of said bus controller comprises:
   a port size correspondence table provided therein;
   determination means for obtaining port size information from master address information using said correspondence table in a bus cycle;
   a bus size determination circuit for obtaining port size information from address information from said data processor using an incorporated port size correspondence table which indicates the correspondence between address areas of said data processing system and port sizes;

a bus timing circuit for receiving a reference clock, a master bus timing signal, a master byte control signal a slave transfer completion signal, and said port size signal and for outputting a slave bus timing signal, a master transfer completion signal, and a divided bus cycle number signal;

an address bus interface circuit for receiving a master bus cycle type signal, a master address signal, a master byte control signal, and said divided bus cycle number signal and for outputting a slave bus cycle type signal, a slave address signal, and a slave byte control signal; and a data bus interface circuit for receiving a master bus cycle type signal, a master byte control signal, and said port size signal and divided bus cycle number signal and for determining a connection condition between said master data bus and said slave data bus for making connection.

2. The bus controller of claim 1, wherein said bus size determination circuit comprises:

at least one address area determination circuit for receiving a predetermined significant bit of a master address signal to determine if each bit agrees with a value set in an address area designation register and makes an output significant when all bits agree;

at least one port size designation circuit for outputting a value set in a port size designation register when said output is significant, a pair of said address area determination circuit and said port size designation circuit provided for each address area; and an OR gate for ORing respective outputs to output a port size signal.

3. A bus controller used for a data processing system having a data processor as a bus master, the bus controller connected between the bus master and a bus slave via a bus to transfer data between the bus master and the bus slave with a plurality of different data port widths, wherein the improvement of said bus controller comprises:

a port size correspondence table provided therein, said port size correspondence table producing port width information responsive to address information for a plurality of different port widths;

determination means, coupled to said port size correspondence table, for obtaining port size information from master address information using said correspondence table in a bus cycle;

a bus size determination circuit for obtaining port size information from address information from said data processor using an incorporated port size correspondence table which indicates the correspondence between address areas of said data processing system and port sizes;

a bus timing circuit for receiving a reference clock, a master bus timing signal, a master byte control signal, a slave transfer completion signal, and said port size signal and for outputting a slave bus timing signal, a master transfer completion signal, and a divided bus cycle number signal;

an address bus interface circuit for receiving a master bus cycle type signal, a master address signal, a master byte control signal, and said divided bus cycle number signal and for outputting a slave bus cycle type signal, a slave address signal, and a slave byte control signal; and a data bus interface circuit for receiving a master bus cycle type signal, a master byte control signal, and said port size signal and divided bus cycle number signal and for determining a connection condition between said master data bus and said slave data bus for making connection.

4. The bus controller of claim 3, wherein said bus size determination circuit comprises:

at least one address area determination circuit for receiving a predetermined significant bit of a master address signal to determine if each bit agrees with a value set in an address area designation register and makes an output significant when all bits agree;

at least one port size designation circuit for outputting a value set in a port size designation register when said output is significant, a pair of said address area determination circuit and said port size designation circuit provided for each address area; and an OR gate for ORing respective outputs to output a port size signal.

* * * * *